US009751113B2

(12) United States Patent
Hougen et al.

(10) Patent No.: US 9,751,113 B2
(45) Date of Patent: Sep. 5, 2017

(54) LUMBER DIVERTERS, LUMBER SORTERS AND RELATED METHODS

(71) Applicant: Mill Tech Industries, Salmon Arm (CA)

(72) Inventors: Ronald James Hougen, Salmon Arm (CA); Robert B. Van Varseveld, Salmon Arm (CA)

(73) Assignee: Mill Tech Industries, Salmon Arm (CA)

( * ) Notice: Subject to any disclaimer, the term of this patent is extended or adjusted under 35 U.S.C. 154(b) by 0 days.

(21) Appl. No.: 14/958,566

(22) Filed: Dec. 3, 2015

(65) Prior Publication Data

US 2017/0157650 A1 Jun. 8, 2017

(51) Int. Cl.

*B65G 47/00* (2006.01)
*B07C 5/38* (2006.01)
*B07C 5/14* (2006.01)

(52) U.S. Cl.

CPC . *B07C 5/38* (2013.01); *B07C 5/14* (2013.01)

(58) Field of Classification Search

CPC .................................. B07C 5/14; B65G 47/82
USPC ........ 198/351, 352, 360, 367; 209/657, 917, 209/517
See application file for complete search history.

(56) References Cited

U.S. PATENT DOCUMENTS 2,937,739 A * 5/1960 Levy .......................... B07C 3/08 198/349
3,397,779 A * 8/1968 Wilder ................. B65G 47/766 198/634
4,742,918 A * 5/1988 Doherty .................... B07C 5/14 209/517
4,742,920 A * 5/1988 Doherty .................... B07C 5/14 209/517
5,632,383 A 5/1997 Bailey
6,629,592 B2 * 10/2003 Bernard ................. B65G 47/44 198/360
7,681,610 B2 3/2010 McGehee et al.
8,061,526 B2 * 11/2011 Henderson ............. B65G 47/44 209/517
8,919,530 B2 * 12/2014 Schreiber ............... B65G 47/71 198/367

* cited by examiner

*Primary Examiner* — William R Harp
(74) *Attorney, Agent, or Firm* — Oyen Wiggs Green & Mutala LLP

(57) ABSTRACT

A lumber sorter includes a plurality of bins. A conveyor carries lumber (e.g. boards) along a path extending above the plurality of bins. A diverter is selectively operable to allow the conveyor to carry the boards past one or more bins or to divert a selected board into a selected bin. The diverter may comprise an upstream gate and a downstream gate, each operable to move between respective closed positions and open positions. In the closed positions, the top surfaces of the upstream and downstream gates are substantially level and allow boards to travel along the path as directed by the conveyor. The diverter may be actuated to the open position in which the upstream and downstream gates are separated, thereby providing a path for a board to fall into a bin.

37 Claims, 9 Drawing Sheets

LUMBER DIVERTERS, LUMBER SORTERS AND RELATED METHODS

TECHNICAL FIELD

This invention relates to sawmill equipment. More particularly the invention relates to methods and apparatus for selectively diverting pieces of lumber. A particular application relates to sorting lumber into bins.

BACKGROUND

Lumber sorters are widely used in sawmills to sort pieces of lumber according to various criteria. For example, pieces of lumber (or "boards") may be sorted by dimensions (e.g. width and/or length), grade or condition, tree species, and the like. A typical lumber sorter comprises a suitable number of bins for receiving sorted boards and a conveyer which carries boards that are to be sorted along a path extending across the tops of the bins. Each bin has a diverter gate which can be actuated to cause a board being carried by the conveyer to drop into the corresponding bin. A controller controls operation of the diverter gates such that each diverter gate opens at a suitable time to deliver into the corresponding bin a board that has been assigned for sorting into the bin.

There is a general desire throughout the sawmill industry to improve the efficiency of sawmills by operating at higher speeds. A disadvantage of existing lumber sorters is that the time taken for diverter gates to open and close limits the speed at which the lumber sorter can operate. Many current lumber sorters have a maximum operating speed of approximately 240 boards carried past each bin per minute. While this is reasonably fast there is a desire for lumber sorters which can operate at higher speeds still.

However, it is difficult to make sorters of existing designs operate faster. At high lug rates the diverter gates must be timed to open and close at precise times with respect to the positions of the boards so as not to lift a preceding board while it is still on the diverter gate, and not to interfere with a following board before the diverter gate is fully closed. In a modern sorter operating at rates of two hundred and forty lugs per minute or even faster, the total time available to open the diverter gate, allow a board to drop out clear of the diverter gate and close the gate again is approximately one-quarter of a second.

The foregoing examples of the related art and limitations related thereto are intended to be illustrative and not exclusive. Other limitations of the related art will become apparent to those of skill in the art upon a reading of the specification and a study of the drawings.

SUMMARY

The invention has a number of different aspects. These include, without limitation, lumber sorters, methods for sorting lumber, methods for diverting pieces of lumber into a bin, sorting bins and diverters.

One example aspect provides a lumber sorter. The lumber sorter includes a plurality of bins. A conveyor carries lumber (e.g. boards) along a path extending above the plurality of bins. A diverter is selectively operable to allow the conveyor to carry the boards past one or more bins or to divert a selected board into a selected bin. The diverter may comprise an upstream gate and a downstream gate, each operable to move between respective closed positions and open positions. In the closed positions, the top surfaces of the upstream and downstream gates are substantially level and allow boards to travel along the path as directed by the conveyor. The diverter may be actuated to the open position in which the upstream and downstream gates are separated, thereby providing a path for a board to fall into a bin. A top surface of the upstream gate may travel substantially parallel to the path as it travels between the open position and the closed position. The downstream gate may be moveable across the path to leave a passage between the upstream gate and the downstream gate sufficiently wide for passage of a board into a bin.

Another example aspect provides a method for diverting pieces of lumber into a bin. The method may comprise blocking an opening of a bin using a diverter. The diverter may comprise an upstream gate and a downstream gate, each operable to move between respective closed positions and open positions. In the closed positions, the top surfaces of the upstream and downstream gates are substantially level and allow boards to travel along the path as directed by the conveyor. Boards may be carried along a path across the top surfaces of the upstream and downstream gates by a conveyor. If a piece of lumber is to be diverted into a bin, the method may comprise unblocking the opening by moving the upstream gate in a direction that is substantially parallel with the path of the lumber but opposite the direction of flow of the lumber. The downstream gate may be lifted across the path to leave a passage between the upstream gate and the downstream gate sufficiently wide for passage of the piece of lumber into the bin.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
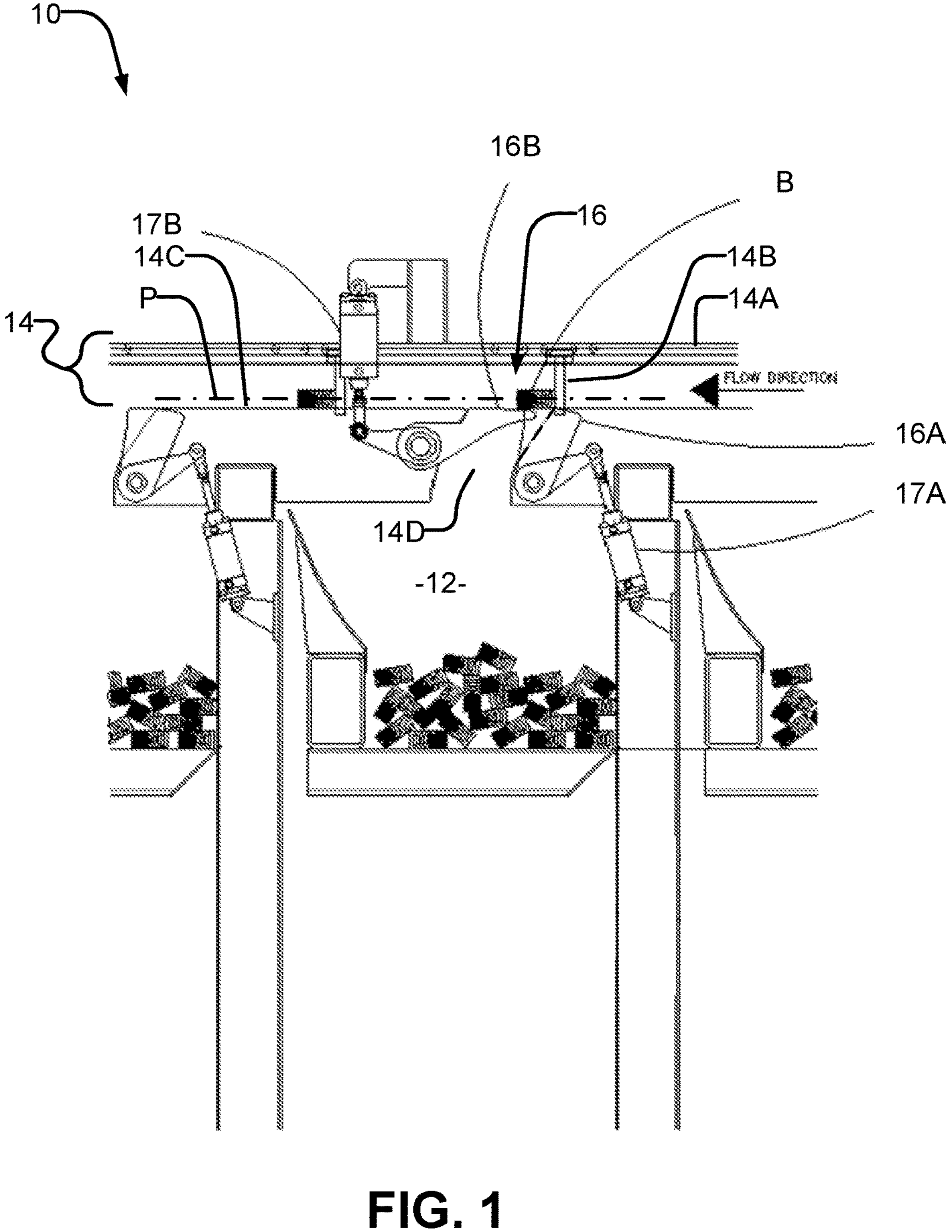
FIG. 1 is a side elevation view of a portion of a lumber sorter including a diverter according to an example embodiment.

FIG. 1 shows a cross-section through one bin of a lumber sorter 10 according to an example embodiment. Lumber sorter 10 includes a bin 12. Bin 12 is one of a plurality of bins. Sorter 10 may comprise any suitable number of bins. In some embodiments sorter 10 has more than 50 bins.

A conveyer 14 carries boards B along a path P extending above bin 12. A diverter 16 is selectively operable to allow conveyer 14 to carry boards B past bin 12 or to divert a selected board B into bin 12.

In some embodiments conveyor 14 is provided by what is commonly known as a "pusher lug" or a "drag chain" sorter top. In such conveyors, boards are carried in a forward direction from upstream to downstream by lugs attached to a lugged chain conveyor (also referred to as a "lugged transfer chain"). The lugged chain conveyor is located above the boards. The boards are supported by a plurality of fixed skid plates. The skid plates are mounted to the top of each sorter bin to provide a smooth, approximately level surface for the boards to slide over as the boards travel along above the bins. The fixed skid plates are further configured to provide open spaces through which boards can drop into each bin.

In the illustrated embodiment, conveyer 14 comprises a plurality of parallel chains 14A that are driven by a drive system (not shown in FIG. 1) to travel generally parallel to path P. Lugs 14B extend downwardly from chains 14A. Boards B extend transversely to conveyer 14 and are supported from below by surfaces 14C. In a typical embodiment surfaces 14C comprise a plurality of fixed skids spaced apart across the transverse width of conveyer 14 and extending in the direction of path P. Each board B is urged along path P by a set of lugs 14B. Different sets of lugs 14B are spaced apart along conveyor 14. Each set of lugs may carry a board B.

Surfaces 14C are interrupted to provide openings 14D through which boards B can enter corresponding bins 12 when diverted by a corresponding diverter 16.

Figure 2:
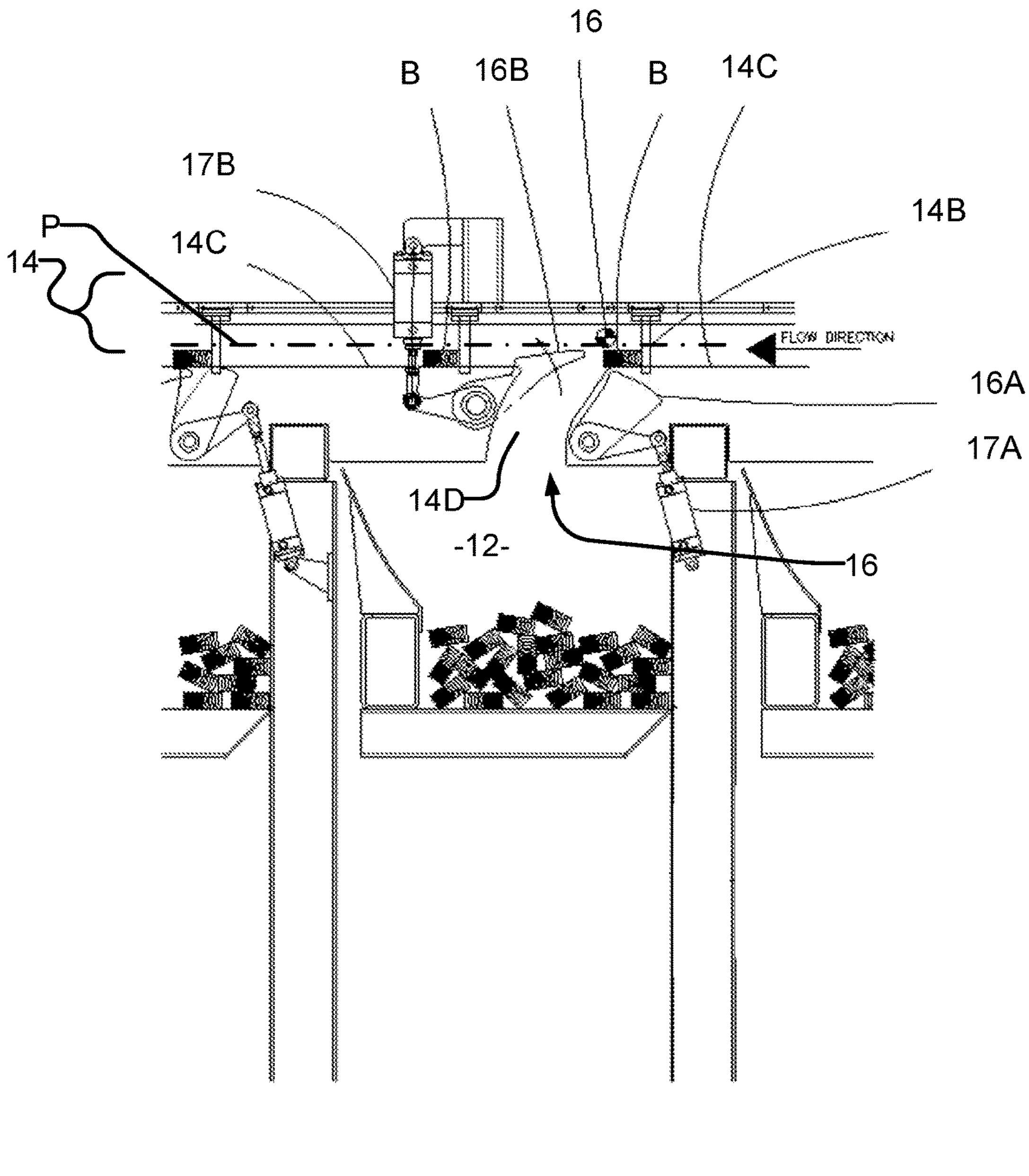
FIG. 2 is a side elevational view of the portion of the lumber sorter shown in FIG. 1 with the diverter in an open configuration to divert a board into a bin.
Figure 3:
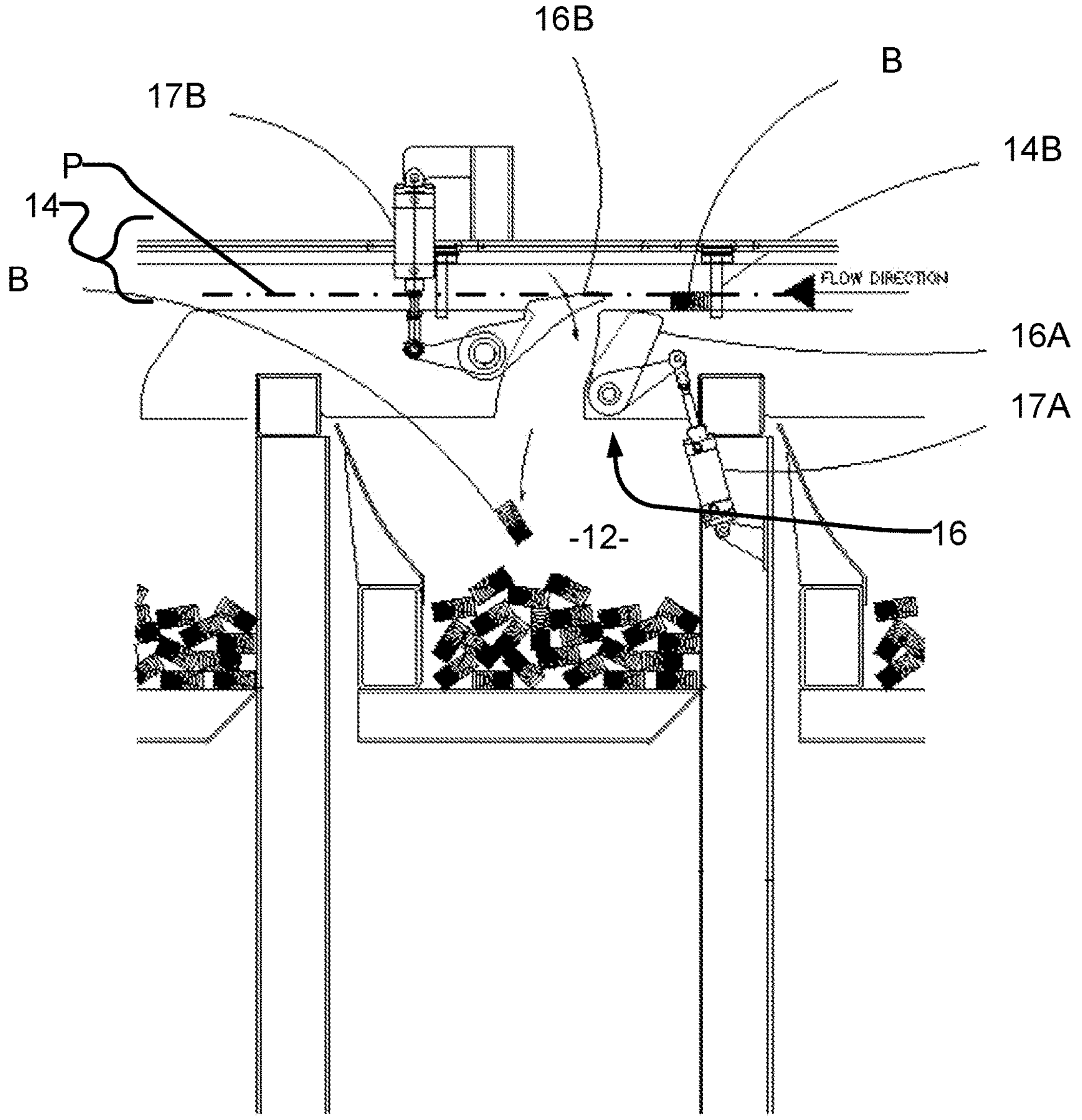
FIG. 3 is a side elevation view of the lumber sorter shown in FIGS. 1 and 2 with the diverter moving to a closed configuration so as to allow a next board to continue along the sorter.

Diverter 16 comprises an upstream gate 16A and a downstream gate 16B. FIGS. 1, 2 and 3 show various phases in the operation of diverter 16. In FIG. 1 diverter 16 is in a closed configuration. In FIG. 2 gates 16A and 16B of diverter 16 are being moved to bring diverter 16 to an open configuration. In FIG. 3 gates 16A and 16B of diverter 16 are being moved to return diverter 16 to the closed configuration.

As shown in FIG. 1, when gates 16A and 16B are in their closed configuration, boards B are carried across opening 14D supported on top surfaces of gates 16A and 16B. In the closed configuration, the top surfaces of gates 16A and 16B are substantially level with surfaces 14C. In some embodiments, when in the closed configuration, gate 16B extends from a downstream edge of opening 14D toward an upstream edge of opening 14D by ⅘ of the distance across opening 14D or less. A length of gate 16B may be chosen based on the thickness of boards B to be sorted and may accommodate the possibility that some boards B may be bowed such that top surfaces of parts of boards B may be elevated above surfaces 14C by more than the thickness of the boards.

As shown in FIG. 2, diverter 16 may be actuated to an open configuration in which gates 16A and 16B are separated, thereby providing a path for board B to fall down through opening 14D into bin 12. In the embodiment illustrated in FIGS. 1 to 3, upstream gate 16A is actuated by an actuator 17A and downstream gate 16B is actuated by an actuator 17B. Actuators 17A and 17B may be separately controlled. In the embodiment illustrated in FIG. 1, actuators 17A and 17B are each linear actuators. For example, actuator 17A and 17B may be electrical linear actuators or pneumatic linear actuators. In other embodiments rotary actuators may be applied to actuate one or both of gates 16A and 16B. In other embodiments (see e.g. FIG. 8) a single actuator is coupled to actuate both of gates 16A and 16B.

By comparing FIGS. 1 and 2 it can be seen that, in moving from its closed configuration to its open configuration, upstream gate 16A moves primarily in an upstream direction (generally parallel to path P and opposite to the direction to boards are being carried by conveyer 14). If necessary or desired, upstream gate 16A may be actuated while a leading edge of a board is already on upstream gate 16A without damage to upstream gate 16A or the board.

In the illustrated embodiment, when upstream gate 16A is in its closed position, the upstream gate 16A provides a smooth approximately level surface at approximately the same elevation as support surfaces 14C. Thus upstream gate 16A effectively comprises movable skids which extend board supporting skid surfaces 14C part way across opening 14D. Similarly, downstream gate 16B effectively comprises movable skids which extend board supporting skid surfaces 14C part way across opening 14D, toward upstream gate 16A. If a larger opening 14D is desired, a longer gate 16A may be employed.

In moving from its closed position to its open position, downstream gate 14B moves primarily upwardly into and across path P such that a selected board B is diverted to pass beneath downstream gate 16B into opening 14D. The selected board B can then fall through opening 14D into bin 12.

Providing an upstream gate 16A that moves in a primarily horizontal direction between its open and closed configurations has the advantage that gate 16A can be made to operate without blocking path P and also without preventing a board that has already entered opening 14D from falling into bin 12. As long as the portion of opening 14D adjacent to leading edge 21A of upstream gate 16A (see FIG. 1A) is wide enough, upstream gate 16A can be actuated to move to its closed configuration even before a board B has had enough time to fall completely past upstream gate 16A.

When returning to its closed position, upstream gate 16A may occasionally make contact with a falling board, but such contact is in a direction to cause the board to fall into bin 12 and cannot cause a jam. Therefore it is not necessary to delay the closing of upstream gate 16A to allow time for a board to fall completely past upstream gate 16A.

Contact between a board B in opening 14D and an upstream gate 14A that is being actuated in the downstream direction toward its closed configuration will merely push the falling board B toward the downstream side of opening 14D. A leading edge 21A of gate 16A may optionally be made concave to reduce the likelihood of contact between leading edge 21A and a falling board B. Leading edge 21A may also prevent boards B from bouncing into a position where they could cause jamming of gate 16A. Leading edge 21A may be vertical or nearly so when gate 16A is nearing its closed configuration. In some embodiments, gate 16A provides a ramp angling from upstream edge 19A into bin 12 when upstream gate 16A is in the open configuration.

Figure 1A:
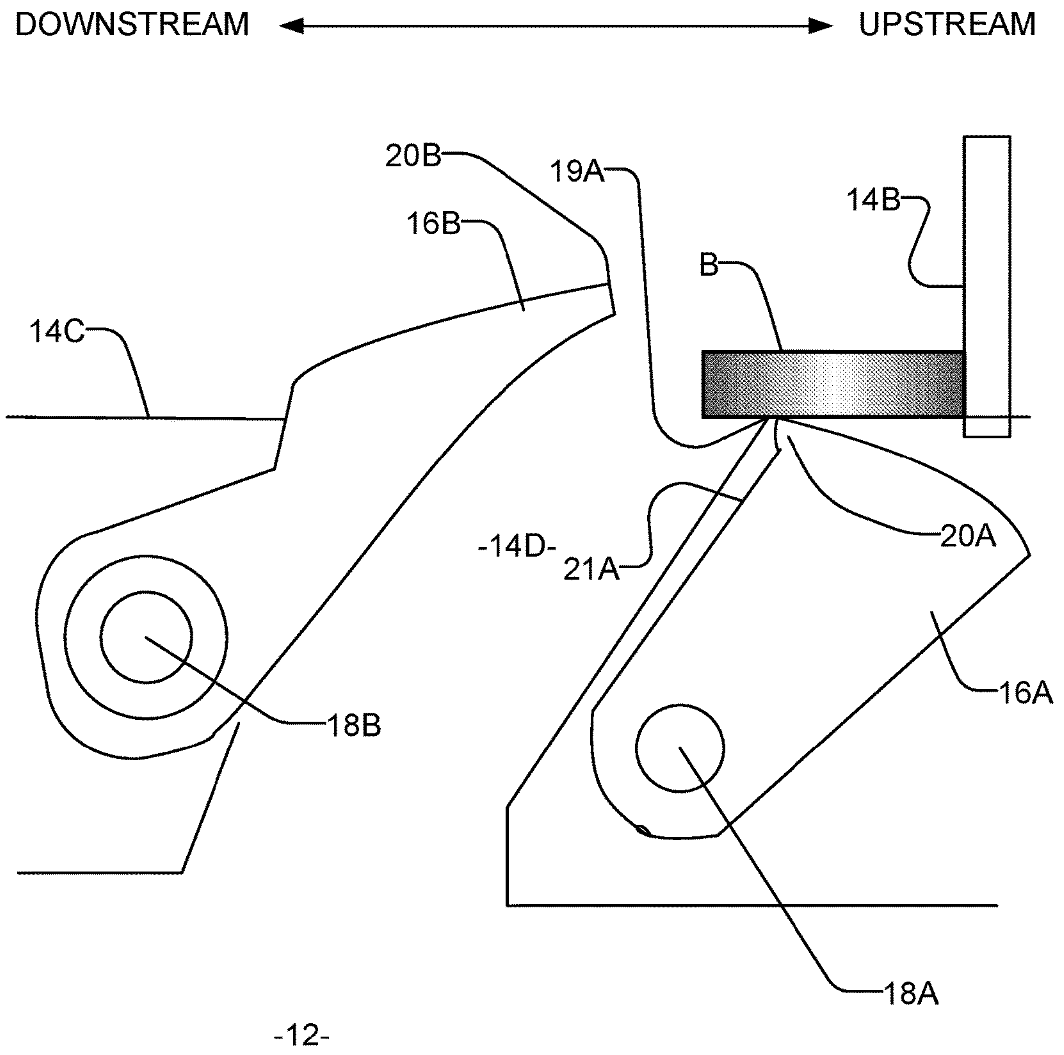
FIG. 1A is an enlarged schematic side view of a diverter like that shown in FIG. 1.

FIG. 1A is a schematic view which illustrates an example geometry for diverter 16. In this example embodiment, upstream gate 16A is mounted to pivot about a pivot axis 18A. Pivot axis 18A is located below and downstream from the upstream edge 20A of opening 14D. In some embodiments, the distance between pivot axis 18A and a downstream edge of the upstream gate is at least one inch. Motion of the downstream corner 19A of gate 16A between the open configuration shown in FIG. 1A and a closed configuration in which gate 16A partially blocks opening 14D is arcuate but in an upper sector of an arc with a sufficiently large radius that motion of downstream corner 19A is primarily horizontal.

Upstream gate 16A may move substantially parallel to path P. For example, upstream gate 16A may move in an arc with an apex that is approximately tangential with path P. In some embodiments upstream gate 16A moves through an angle of 50° or less between its open and closed configurations.

In some embodiments an elevation of downstream corner 19A of upstream gate 16A varies by no more than about one inch as upstream gate 16A moves between its open and closed configurations. In some embodiments, downstream corner 19A of gate 16A crosses a vertical line extending through pivot axis 18A as gate 16A is actuated between its open and closed configurations. In some embodiments, when the upstream gate is in the closed configuration, a downstream end of the upstream gate is within 10 or 12 degrees of vertical, as measured from pivot axis 18A.

In some embodiments, gate 16A comprises a plurality of arms. The plurality of arms optionally have upper edges that are arcuate. The centers of curvatures of the arcuate upper edges of the arms of gate 16A may coincide with pivot axis 18A.

In the embodiment illustrated in FIG. 1A, downstream gate 16B is pivotally mounted for rotation about a pivot axis 18B. Pivot axis 18B is at an elevation above pivot axis 18A and is located downstream from the downstream edge of opening 14D. As a result, the upstream corner 20B of gate 16B moves significantly in a vertical direction when gate 16B is moved from its closed configuration to the open configuration shown in FIG. 1A. In some embodiments, when gate 16B is closed, an angle between the upstream end of the gate 16B and vertical measured relative to pivot axis 18B is at least 45°. In some embodiments, when gate 16B is in its open configuration, an elevation of upstream corner 20B is greater than a thickness of boards B to be sorted plus an allowance for bowing of the boards.

Figure 4:
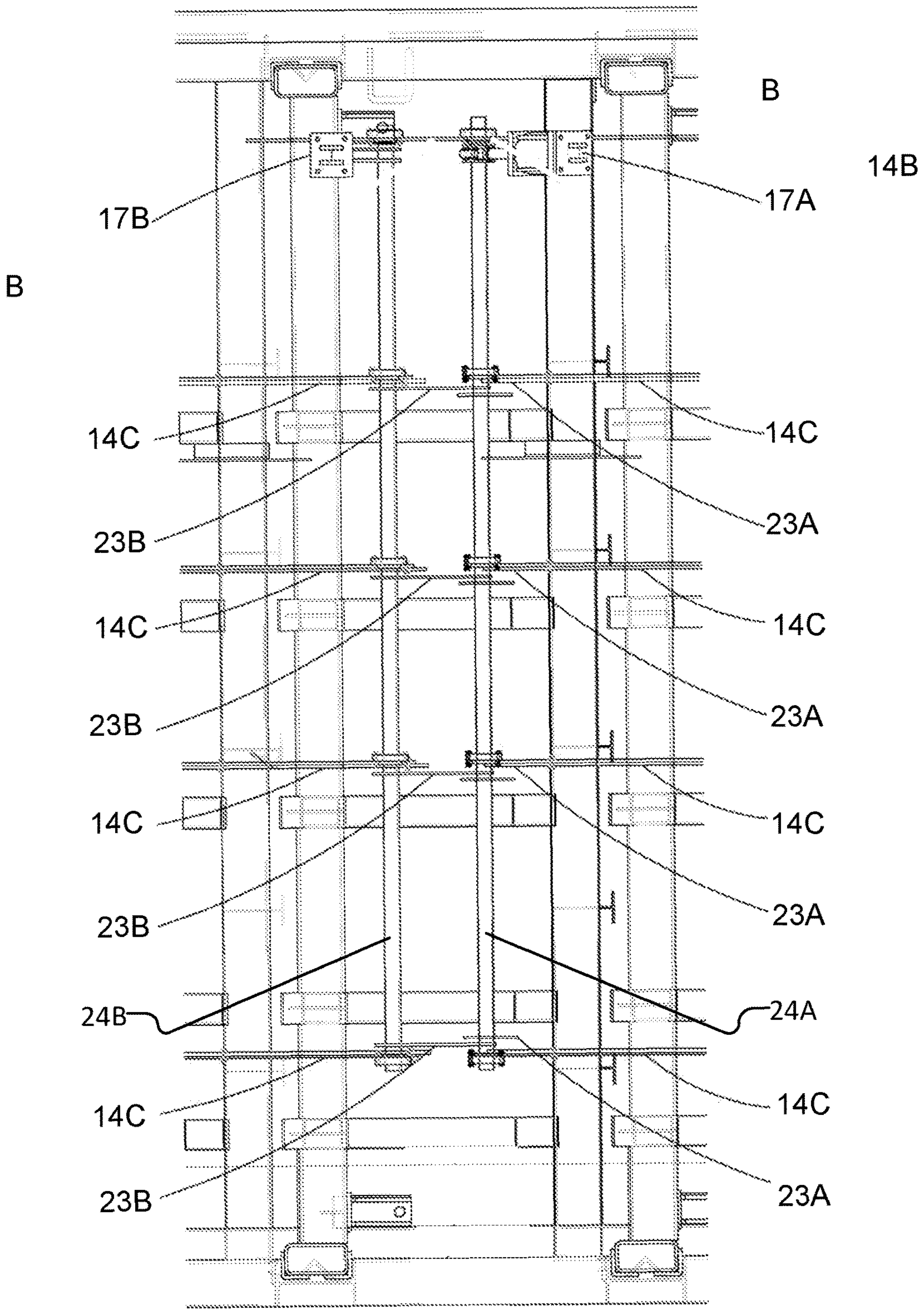
FIG. 4 is a top plane view of the portion of the lumber sorter shown in FIG. 1 with the conveyer removed to reveal details of an example embodiment of the diverter.

FIG. 4 is a top plan view of a diverter 16 according to an example embodiment (for example, the diverter as shown in FIGS. 1 to 3 may be constructed as shown in FIG. 4). Portions of conveyor 14 above surfaces 14C are not shown in FIG. 4. In this embodiment, upstream gate 16A comprises a plurality of arms 23A spaced apart across the width of lumber sorter 10.

Arms 23A extend from a shaft 24A. Arms 23A are offset in the transverse direction from skids 25 which carry surfaces 14C such that upstream gate 16A can move between open and closed configurations as described above. In some embodiments, shaft 24A is mounted in bearings with its longitudinal axis lying along pivot axis 18A such that gate 16A can be actuated between its open and closed configurations by rotating shaft 24A.

Downstream gate 16B also comprises a plurality of arms 23B that are spaced apart across the width of lumber sorter 10. Arms 23B extend from a shaft 24B. Arms 23B are offset in the transverse direction from skids 25 which carry surfaces 14C and from arms 23A of upstream gate 16A such that downstream gate 16B can move between open and closed configurations as described above. In some embodiments, arms 23B and arms 23A are interleaved. In some embodiments, shaft 24B is mounted in bearings with its longitudinal axis lying along pivot axis 18B such that gate 16B can be actuated between its open and closed configurations by rotating shaft 24B.

Figure 5:
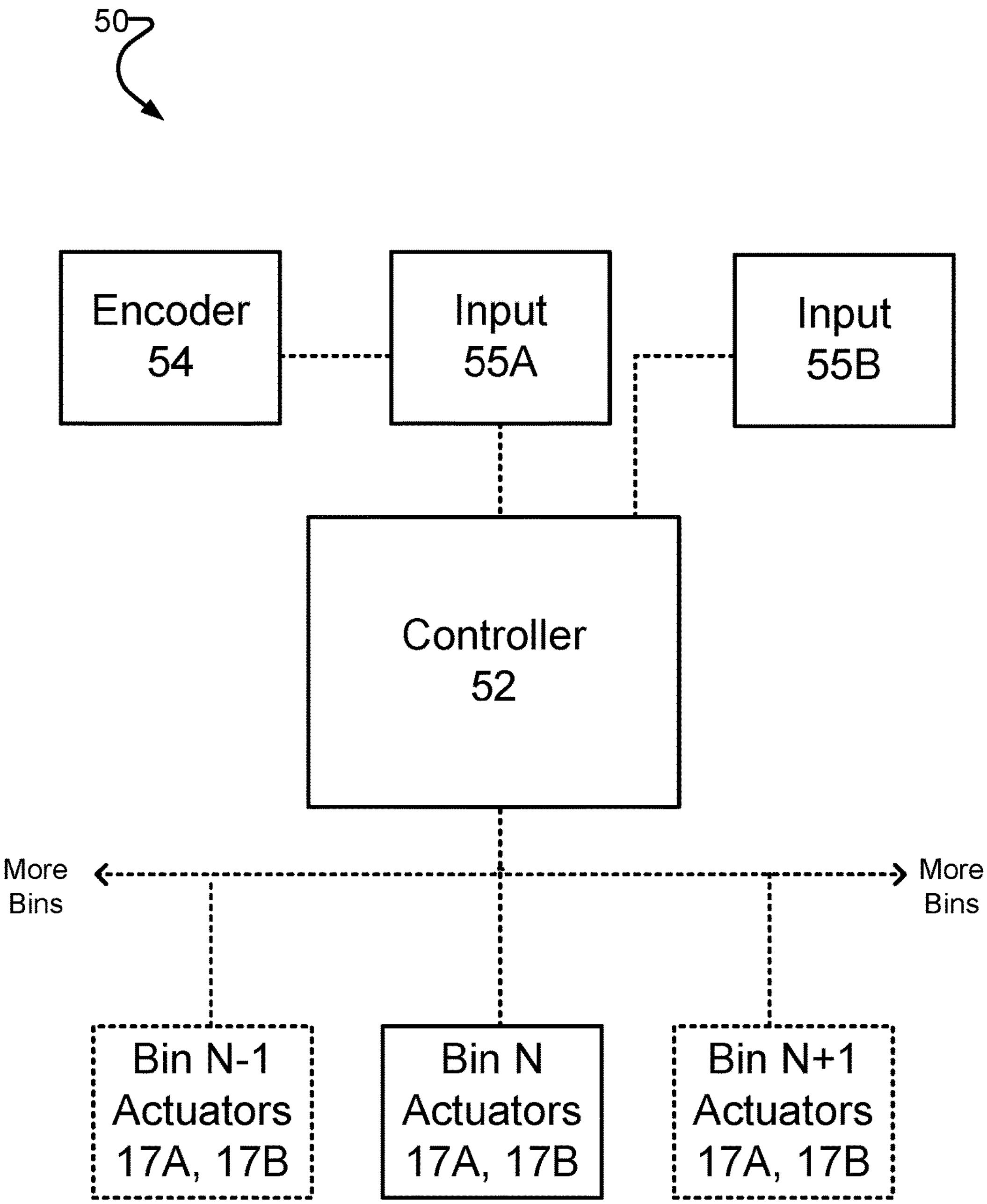
FIG. 5 is schematic view illustrating a control system suitable for use with the diverter of FIG. 1.

FIG. 5 is a schematic diagram illustrating a control system 50 for a lumber sorter 10. Features of the control system not related to operation of diverters 16 are omitted for clarity. Control system 50 includes a controller 52 (e.g. a control circuit) that, in response to input signals identifying which boards B are to be sorted into which bins 12, coordinates the operation of diverters 16 such that the desired sorting is achieved. In some embodiments controller 52 comprises a programmable controller which executes software and/or firmware instructions to perform control functions as described herein In other embodiments controller 52 comprises one or more of hardwired logic circuits, programmable processors together with software and/or firmware instructions and configurable logic circuits together with configuration instructions. Controller 52 may comprise a single unit or the functions of controller 52 may be distributed. In a currently preferred embodiment, controller 52 is provided by a system of one or more programmable industrial controls such as those available from Allen Bradley, Siemens, Hitachi, Automation Direct, and others.

Controller 52 receives an input 55A from an encoder 54 mounted to provide an output indicative of the positions of lugs 14B of conveyor 14. Encoder 54 may, for example, comprise a rotary encoder driven by a drive motor or drive shaft for conveyor 14. Controller 52 also receives an input 55B that indicates which bin 12 should receive the board B being carried by each lug 14B. This information may, for example, come from a lumber grading system. For each board B, controller 52 determines based on input signal 55A when the board is approaching the diverter 16 for the bin into which the board will be sorted and controls the corresponding actuators 17A and 17B to move gates 16A and 16B of the corresponding diverter 16 to the open configuration. After the board has been diverted into the correct bin, controller 52 returns gates 16A and 16B to their closed configurations.

In some embodiments, controller 52 implements a "lazy" procedure in which a diverter 16 is kept in its open position in cases where a sequence of two or more boards are to be delivered to the same bin. The diverter may be actuated to its closed configuration after the last board in the sequence has been diverted into the bin.

The maximum opening of diverter 16 determines the maximum width of boards that can be effectively sorted using diverter 16. Providing diverters having two gates 16A and 16B allows a desired maximum opening to be achieved with a relatively small downstream gate 16B. In some embodiments, gate 16B may be shortened due to the existence of gate 16A, since boards B are able to begin falling before reaching gate 16B.

In some embodiments, downstream gate 16B extends across between 60% and 90% or 65% to 80% in some embodiments of the width of opening 14D when downstream gate 16B is in the closed configuration. For example, in such embodiments, if opening 14D is 14 inches wide, downstream gate 16B may extend in the range of 9 to 12½ inches into opening 14D when in the closed configuration.

The length of gate 16A may be selected based at least partially, on the length of gate 16B. In some embodiments, upstream gate 16A extends across between 30% and 50% of opening 14D when upstream gate 16A is in the closed configuration. For example, in such embodiments if opening 14D is 14 inches wide, upstream gate may extend between 4 and 7 inches into opening 14D when in the closed configuration.

A smaller gate 16B may be lighter and/or have a smaller moment of inertia and may be actuated to move between open and closed configurations relatively quickly with lower forces and reduced wear and tear on equipment as compared to the case where a longer single gate is used to provide a diverter having an equivalent maximum opening. Another advantage of a shorter gate 12B is that the time during which actuation of the gate must be inhibited because a preceding board is on top of the gate is reduced. For a given speed of conveyor 14, the time required for conveyor 14 to carry a preceding board across a shorter gate is smaller than would be required to carry the same board across a longer gate. A further advantage of the illustrated configuration is that the upstream edge of the downstream gate is downstream relative to the upstream edge of the opening and so downstream gate may be actuated later without interfering with an approaching board.

Figure 6A:
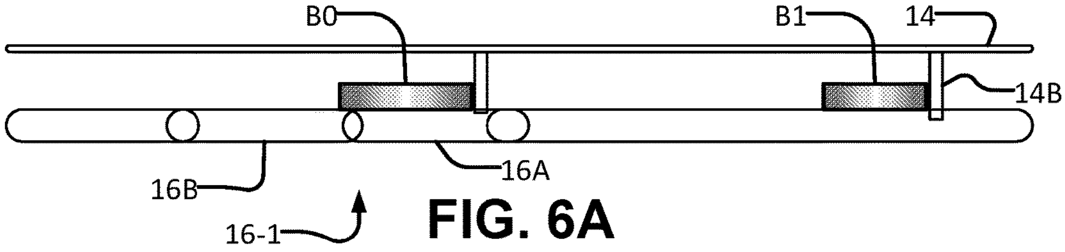
FIGS. 6A to 6F are schematic views of a diverter gate illustrating timing at which upstream and downstream gates may be actuated to divert a board.
Figure 6B:
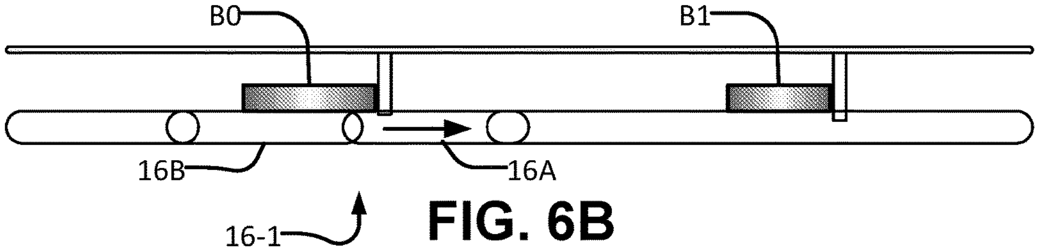
Figure 6C:
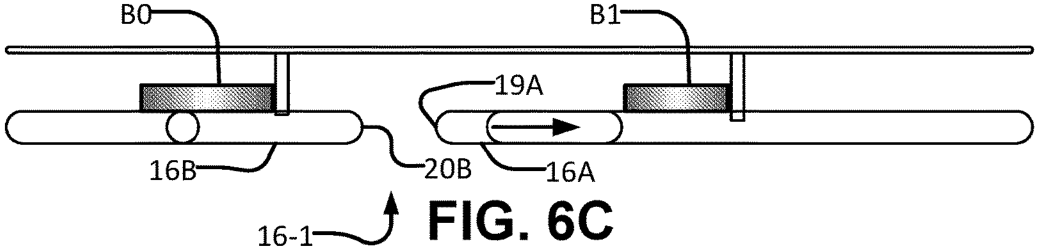

FIGS. 6A to 6F illustrate a sequence of operations of an example diverter 16. In FIG. 6A, a board B1 is intended to be sorted into a bin 12-1. A previous board B0 is currently passing over diverter 16-1 which corresponds to bin 12-1. The earliest time for opening downstream gate 16B to divert an approaching board is determined by the point where a preceding board B0 is clear of downstream gate 16B. Because downstream gate 16B is shorter than a conventional single diverter gate, a greater clearance between the upstream tip 19B of downstream gate 16B and the leading edge of an approaching board allows conveyor 14 to travel at a higher speed without risk of interference between downstream gate 16B and approaching boards.

After downstream gate 16B has been opened to divert a board, it must be possible to close downstream gate 16B in time to allow a subsequent board to pass over downstream gate 16B. This requires upstream tip 19B of downstream gate 16B to reach its closed position before the leading edge of an approaching board reaches the same location. Because downstream gate 16B is shorter than a conventional single diverter gate, a greater clearance from the tip of downstream gate 16B to the leading edge of an approaching board allows conveyor 14 to travel at a higher speed without risk of interference between the primary diverter gate and approaching boards.

Upstream gate 16A may commence opening (FIG. 6B) as soon as (or even slightly before) previous board B0 has completely passed over upstream gate 16A. This allows upstream gate to be opening (FIG. 6C) while the previous board B0 is passing over downstream gate 16B.

Figure 6D:
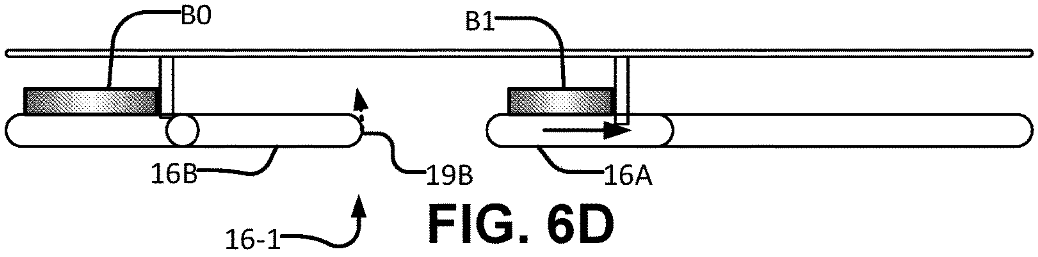
Figure 6E:
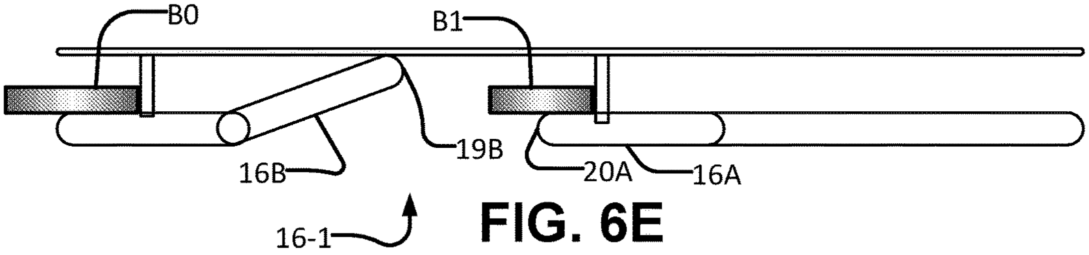
Figure 6F:
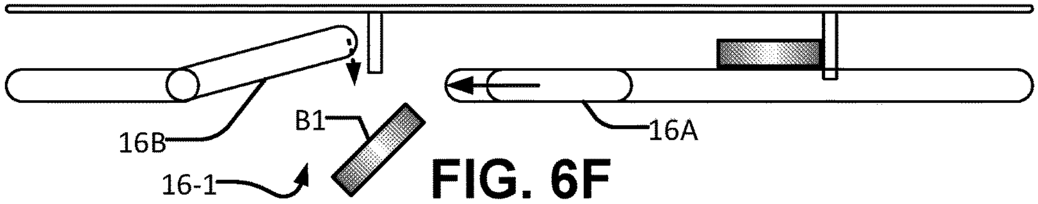

As soon as board B0 has passed over downstream gate 16B, downstream gate 16B may commence opening (FIG. 6D). In the meantime, board B1 continues to progress toward the opening made accessible by diverter 16-1 (FIG. 6E) until board B1 falls through into the opening (FIG. 6F). Gates 16A and 16B may commence closing as soon as board B1 has fallen into the opening (e.g. as soon as pusher lug 14B reaches the upstream edge 20A of opening 14D).

It is not mandatory that gates 16A and 16B are actuated at the same times. FIGS. 6A to 6F illustrate an example embodiment in which positions of gates 16A and 16B are individually controlled with respect to the position of a pusher lug 14B. Applications of the technology described herein may provide a more favorable ratio of open to closed time and greater clearance between downstream gate 16B and an approaching board B. Allowing upstream gate 16A to begin opening while a preceding board is still travelling above downstream gate 16B effectively increases the time available for gate 16B to open after a preceding board passes over gate 16B (as compared to the case where gate 16B is long enough to cover the entire opening on its own). This facilitates operating conveyor 14 at a higher speed or with pusher lugs 14B closer together. Even in applications where maximizing lug rate (i.e. the number of boards that can be sorted at a diverter in a given time) is not a concern, facilitating operation with lugs of conveyor 14 spaced more closely together is a way to reduce the linear speed of boards for the same lug rate and thereby improve the diverting action.

Figure 7A:
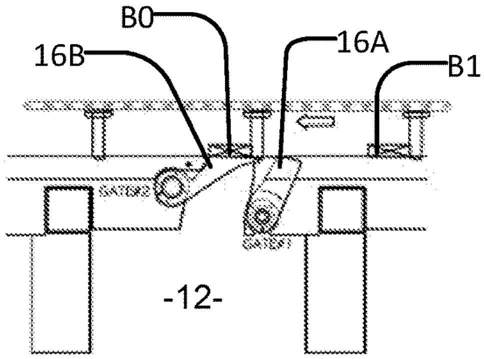
FIGS. 7A to 7H are schematic views of the lumber sorter shown in FIGS. 1 and 2 illustrating timing at which upstream and downstream gates may be actuated to divert a board.
Figure 7B:
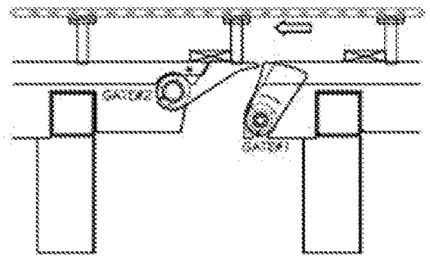
Figure 7C:
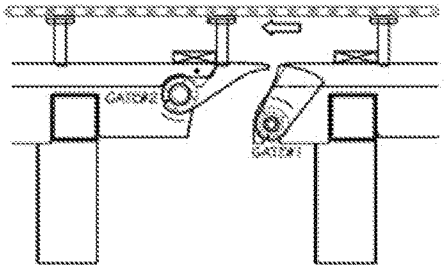
Figure 7D:
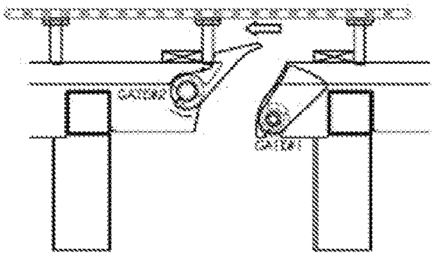
Figure 7E:
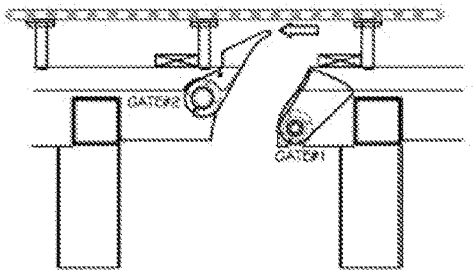

FIGS. 7A to 7H illustrate a sequence of operations of a diverter 16 according to another embodiment. Once board B0 passes over upstream gate 16A, upstream gate 16A can move (e.g. pivot) into the open position to receive board B1 (FIGS. 7A and 7B). Similarly, once board B1 passes over a downstream edge of downstream gate 16B, downstream gate 16B can move to an open position, so as to divert board B1 into bin 12 (FIGS. 7C to 7F).

Figure 7F:
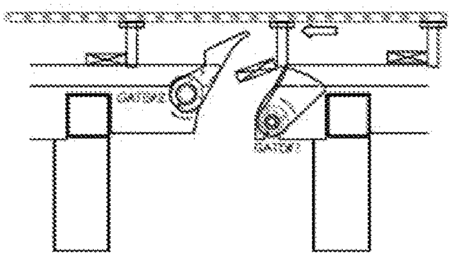
Figure 7G:
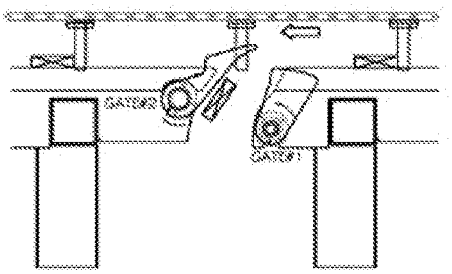
Figure 7H:
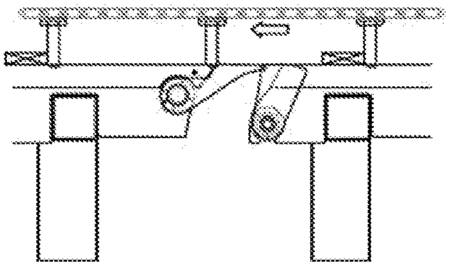

After board B1 has passed below downstream gate 16B, downstream gate 16B can begin to close (FIGS. 7G and 7H). After board B1 has passed the downstream edge of upstream gate 16A, upstream gate 16A can begin to close (FIGS. 7F to 7H). In some embodiments, downstream gate 16B closes or begins to close before upstream gate 16A. In other embodiments, upstream gate 16A closes or begins to close before downstream gate 16B. In further embodiments still, upstream gate 16A and downstream gate 16B close substantially simultaneously.

Figure 8:
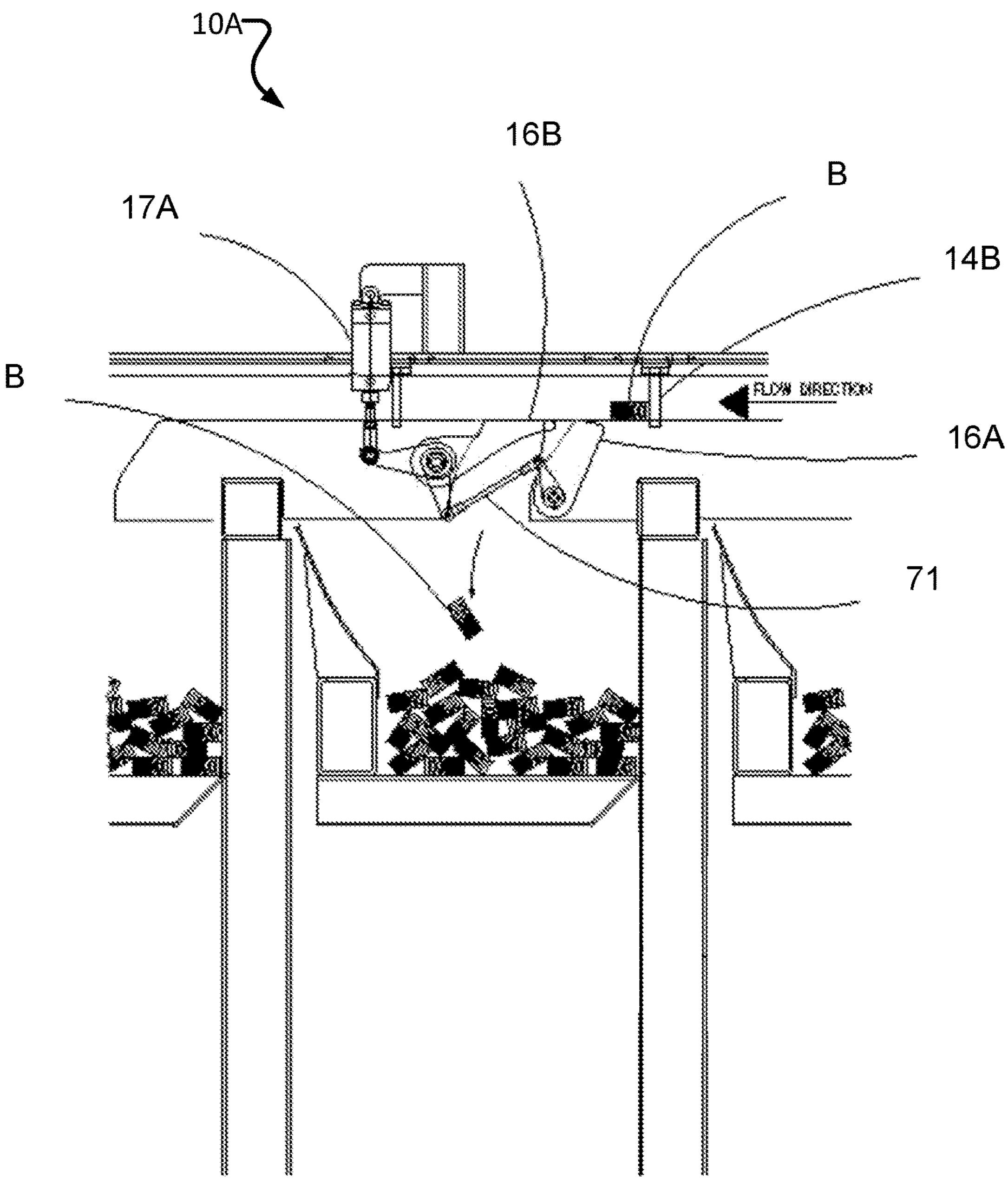
FIG. 8 is a side elevation view through a portion of a lumber sorter according to an alternative embodiment.

FIG. 8 shows a lumber sorter 10A similar to lumber sorter 10 except that a single actuator 17A operates both of gates 16A and 16B. In this example embodiment a linkage connects gates 16A and 16B to open and close together. FIG. 8 shows the example case where the linkage is provided by a cross-link 71 connected between downstream gate 16B and upstream gate 16A. In this configuration, the motions of upstream and downstream gates 16A and 16B cannot be timed independently. The FIG. 8 embodiment provides some of the advantages of the FIG. 1 embodiment at a cost that is reduced.

In a lumber sorter that includes diverters as described herein, it is not mandatory that all bins have the same type of diverter. For example, in some embodiments a sorter has diverters as described herein for bins at the upstream end of the sorter and conventional diverters for bins at the downstream end of the sorter.

Sorters as described herein may be optimized for different operating environments. In a sawmill sorter application, the geometry of gates 16A and 16B is selected to allow the widest board produced to be sorted. For example, boards may range in width from two or four inches to twelve inches. In a sawmill, boards of all widths may be randomly mixed together, so in sawmill applications diverters 16 may be designed and timed to handle the widest boards (which present a worst case for timing problems) at all times.

In a planer mill application it is common that all boards processed during a batch run, which may last for hours or days, will have the same width. This presents an opportunity to optimize the timing of operation of downstream gate 16B for best performance for each width of board. For example, during a run of four inch wide boards, there is a greater distance from the trailing edge of a board to the leading edge of the following board. This allows the timing of the primary diverter gate opening and closing to be based on a higher conveyor speed than would be possible when running twelve inch wide boards. Particularly for such applications a controller may automatically vary timing of downstream gate 16B and/or upstream gate 16A for best performance based on board width. In some embodiments a sensor measures the width of each board entering the sorter. In other embodiments a controller for the sorter receives information specifying the width of each board entering the sorter (e.g. from a saw mill control system). In some embodiments a user interface allows a user to specify a width for all boards to be processed by the sorter.

In an application such as a planermill where only one width of boards is processed during a batch run, the controller may be programmed to set the timing of movements of gates 16A and 16B so as to maximize the lug rate for each width of board.

It can be appreciated from the foregoing that certain embodiments have certain advantages over conventional lumber sorters which have a single diverter gate. These advantages may include:

- potential for higher speed operation resulting from the use of lighter moving parts;
- potential for higher speed operation facilitated by the shorter length of the downstream diverter gate which increases the time available to actuate the downstream gate between moving boards;
- potential for higher speed operation resulting from the innovative geometry of the upstream gate which increases the time available to actuate the downstream gate between moving boards;
- reduced potential of a jam-up;
- ability to be operated at a speed of at least 280 lugs crossing the opening per minute; and/or
- ability to be retrofit onto existing bin sorters in place of existing conventional diverter gates.

It is not a requirement that every embodiment has all or any of these advantages.

While a number of exemplary aspects and embodiments are discussed herein, those of skill in the art will recognize certain modifications, permutations, additions and sub-combinations thereof. Some non-limiting examples of such modifications are:

- upstream gate 16A may be mounted to slide, for example on linear rails or on tracks (which are not necessarily straight), between its open and closed configurations;
- downstream gate 16B may be mounted to slide, for example on linear rails or on tracks (which are not necessarily linear), between its open and closed configurations. In some embodiments, the motion of downstream gate 16B is vertical or nearly vertical (e.g. within ±10 degrees of vertical);
- rotary actuators may be coupled through suitable linkages and/or transmissions and/or screws to move gates 16A and/or 16B; and/or
- It is good design but not essential for gates 16A and 16B to overlap when in the closed configuration. One could make gates 16A and 16B shorter such that there is a gap between downstream end 19A of gate 16A and the upstream end 20B of gate 16B with diverter 16 in its closed configuration as long as the gap is small enough not to cause problems.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true scope.

What is claimed is:

1. A lumber sorter comprising:

a conveyor arranged to deliver pieces of lumber along a path in a flow direction across an opening of at least one bin from an upstream side of the opening to a downstream side of the opening;

a diverter comprising upstream and downstream gates respectively extending from the upstream side and the downstream side of the opening, the gates having a closed configuration in which lumber being delivered by the conveyor is blocked from entering the bin and an open configuration in which lumber being delivered by the conveyor is diverted into the bin through the opening; and at least one actuator connected to selectively actuate the upstream and downstream gates between the closed and open configurations;

wherein actuation of the downstream gate from the closed configuration to the open configuration lifts at least an upstream end of the downstream gate into the path and actuation of the upstream gate from the closed configuration to the open configuration moves the upstream gate in an upstream direction substantially parallel to the path.

2. A lumber sorter according to claim 1 wherein the upstream gate is mounted to be rotatable about a first pivot axis and moving the upstream gate between the closed and open configurations comprises rotating the upstream gate about the first pivot axis.

3. A lumber sorter according to claim 2 wherein the first pivot axis is located below and downstream from the upstream side of the opening.

4. A lumber sorter according to claim 3 wherein moving the upstream gate between the closed and open configurations comprises rotating the upstream gate through an angle of not more than 50 degrees about the first pivot axis.

5. A lumber sorter according to claim 2 wherein when the upstream gate is in the closed configuration a downstream end of the upstream gate is downstream from the first pivot axis.

6. A lumber sorter according to claim 2 wherein when the upstream gate is in the closed configuration a downstream end of the upstream gate is within 10 degrees of vertical as measured from the first pivot axis.

7. A lumber sorter according to claim 2 wherein a distance between the first pivot axis and a downstream edge of the upstream gate is at least one inch.

8. A lumber sorter according to claim 2 wherein the downstream gate is mounted to be rotatable about a second pivot axis and moving the downstream gate between the closed and open configurations comprises rotating the downstream gate about the second pivot axis.

9. A lumber sorter according to claim 8 wherein the second pivot axis is at an elevation higher than the first pivot axis.

10. A lumber sorter according to claim 8 wherein when the downstream gate is in the closed configuration an angle between the upstream end of the downstream gate and vertical measured relative to the second pivot axis is at least 45 degrees.

11. A lumber sorter according to claim 1 wherein the upstream gate provides a ramp angling from an upstream edge of the opening into the bin when the upstream gate is in the open configuration.

12. A lumber sorter according to claim 1 wherein the upstream gate comprises a plurality of arms spaced apart along a transverse dimension of the opening transverse to the flow direction.

13. A lumber sorter according to claim 12 wherein upper edges of the arms of the upstream gate are arcuate.

14. A lumber sorter according to claim 13 wherein centers of curvature of the arcuate upper edges of the arms of the upstream gate coincide with the pivot axis.

15. A lumber sorter according to claim 12 wherein downstream-facing edges of the arms of the upstream gate are concave.

16. A lumber sorter according to claim 1 wherein the upstream gate is slidably mounted for sliding motion in a direction generally parallel to the flow direction and moving the upstream gate between the closed and open configurations comprises sliding the upstream gate.

17. A lumber sorter according to claim 1 wherein the upstream gate comprises a plurality of arms spaced apart along a transverse dimension of the opening transverse to the flow direction and the downstream gate comprises a plurality of arms spaced apart along the transverse dimension of the opening transverse to the flow direction, the arms of the downstream gate interleaved between the arms of the upstream gate when the upstream and downstream gates are in the closed configuration.

18. A lumber sorter according to claim 1 wherein an elevation difference in the position of the downstream edge of the upstream gate between the closed and open configurations does not exceed one inch.

19. A lumber sorter according to claim 1 wherein the downstream gate, when in the closed configuration, extends from a downstream edge of the opening toward an upstream edge of the opening no more than 4/5 of a distance across the opening.

20. A lumber sorter according to claim 1 wherein the conveyor comprises a lugged transfer chain having lugs spaced at intervals along the path.

21. A lumber sorter according to claim 1 wherein the path is defined by a plurality of fixed skids extending in the flow direction, the fixed skids extending to the upstream and downstream edges of the opening.

22. A lumber sorter according to claim 21 wherein the upstream and downstream gates each comprise a plurality of movable skids spaced apart across the opening and when the upstream and downstream gates are in the closed configuration the movable skids form an extension of the path across the opening.

23. A lumber sorter according to claim 22 wherein when the upstream and downstream gates are in the closed configuration the movable skids extend across the opening at approximately the same elevation as the fixed skids.

24. A lumber sorter according to claim 1 wherein the at least one actuator comprises at least one first actuator coupled to actuate the downstream gate between the closed and open configurations and at least one second actuator coupled to actuate the upstream gate between the closed and open configurations.

25. A lumber sorter according to claim 24 wherein the first and second actuators comprise linear actuators.

26. A lumber sorter according to claim 24 comprising a controller comprising a control circuit connected to actuate the first and second actuators wherein the control circuit is configured to operate the actuators to move the upstream and downstream gates from the open configuration to the closed configuration in a sequence such that the first actuator is controlled to commence moving of the downstream gate to the closed configuration after the second actuator is controlled to commence moving of the upstream gate to the closed configuration.

27. A lumber sorter according to claim 26 wherein the control circuit is configured to operate the actuators to move the upstream and downstream gates from the closed configuration to the open configuration in a sequence such that the first actuator is controlled to commence moving of the downstream gate to the open configuration after the second actuator is controlled to commence moving of the upstream gate to the open configuration.

28. A lumber sorter according to claim 26 wherein the control circuit is connected to receive a signal indicative of widths of the lumber pieces and, in response to the signal indicating that the width of the lumber pieces is less than a threshold width the control circuit is configured to maintain the upstream gate in the closed configuration and to move only the downstream gate between the open and closed configurations depending on whether or not the piece of lumber is to be diverted into the bin.

29. A lumber sorter according to claim 28 wherein the lugged transfer chain operates at a speed of at least 280 lugs crossing the opening per minute.

30. A lumber sorter according to claim 26 wherein the conveyor comprises a lugged transfer chain and, the controller is configured to synchronize movement of the first and second gates to passage of lugs of the lugged transfer chain across the opening.

31. A lumber sorter according to claim 1 wherein the at least one actuator comprises a single actuator coupled to actuate the downstream gate between the closed and open configurations and at to actuate the upstream gate between the closed and open configurations.

32. A lumber sorter according to claim 1 wherein the upstream gate extends across between 65% to 90% of the opening when the upstream gate is in the closed configuration.

33. A lumber sorter according to claim 1 wherein the downstream gate extends across between 30% to 50% of the opening when the downstream gate is in the closed configuration.

34. A method for diverting pieces of lumber into a bin, the method comprising blocking an opening of the bin by a diverter comprising an upstream gate and a downstream gate, the upstream gate extending part way across the opening from an upstream edge of the opening and the downstream gate extending part way across the opening from a downstream edge of the opening;

carrying a piece of lumber in a flow direction along a path extending across the opening of the bin;

if the piece of lumber is to be diverted into the bin, unblocking the opening by moving the upstream gate against the flow direction in a movement that is substantially parallel to the path and moving the downstream gate such that an upstream end of the downstream gate is lifted across the path to leave a passage between the upstream and downstream gates sufficiently wide for passage of the piece of lumber into the bin.

35. A method according to claim 34 wherein moving the upstream gate comprises rotating the upstream gate about a first pivot axis.

36. A method according to claim 34 wherein moving the downstream gate comprises rotating the downstream gate about a second pivot axis.

37. A method according to claim 34 wherein the second pivot axis is at an elevation above the first pivot axis.

* * * * *